US010430250B2

(12) United States Patent
Ishikawa et al.

(10) Patent No.: US 10,430,250 B2
(45) Date of Patent: Oct. 1, 2019

(54) DECOMPOSING MONOLITHIC APPLICATION INTO MICROSERVICES

(71) Applicant: INTERNATIONAL BUSINESS MACHINES CORPORATION, Armonk, NY (US)

(72) Inventors: Miki Ishikawa, Yokohama (JP); Rina Nakazawa, Tokyo (JP); Takanori Ueda, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 157 days.

(21) Appl. No.: 15/729,878

(22) Filed: Oct. 11, 2017

(65) Prior Publication Data
US 2019/0108067 A1 Apr. 11, 2019

(51) Int. Cl.
G06F 9/44 (2018.01)
G06F 9/50 (2006.01)
(Continued)

(52) U.S. Cl.
CPC .............. G06F 9/5077 (2013.01); G06F 8/76 (2013.01); G06F 9/44505 (2013.01);
(Continued)

(58) Field of Classification Search
CPC .......................................................... G06F 8/76
See application file for complete search history.

(56) References Cited

U.S. PATENT DOCUMENTS 8,458,651 B2 * 6/2013 Kurian ...................... G06F 8/76
717/106
9,384,114 B2 7/2016 Carmel et al.
(Continued)

FOREIGN PATENT DOCUMENTS

EP          3411785 A1 * 12/2018 ............... G06F 8/76
WO   WO-2018197928 A1 * 11/2018 ............... G06F 8/76

OTHER PUBLICATIONS

Mazlami, Genc, Jürgen Cito, and Philipp Leitner. "Extraction of microservices from monolithic software architectures." 2017 IEEE International Conference on Web Services (ICWS). IEEE, 2017. (Year: 2017).*

(Continued)

Primary Examiner — Matthew J Brophy
(74) Attorney, Agent, or Firm — Tutunjian & Bitetto, P.C.; Vazken Alexanian

(57) ABSTRACT

A method transforms a monolithic application into microservices. The method groups application classes and methods into clusters, each corresponding to a respective microservice. The method determines a number of function calls to and from each clustered class and method. The method presents processing options for at least the one of the clustered classes and the methods that has a maximum value for the number of functions calls. The options include: create a new cluster with the at least of the classes and the methods; merge the at least one of the classes and the methods into a different cluster; duplicate the at least one of the classes and the methods into clusters having caller or callee classes or methods; and remain the at least one of the classes and the methods. The method processes the at least one of the classes and the methods based on the user selected option.

20 Claims, 13 Drawing Sheets

(51) Int. Cl.
  *H04L 12/24*  (2006.01)
  *G06F 9/445*  (2018.01)
  *G06F 8/76*  (2018.01)
  *G06F 8/65*  (2018.01)

(52) U.S. Cl.
  CPC .......... *H04L 41/50* (2013.01); *H04L 41/5041* (2013.01); *G06F 8/65* (2013.01); *H04L 41/0886* (2013.01)

(56) References Cited

U.S. PATENT DOCUMENTS

| | | | |
|---|---|---|---|
| 9,405,603 B2 | 8/2016 | Roth et al. | |
| 9,652,214 B1 | 5/2017 | Eberlein | |
| 10,178,045 B2* | 1/2019 | Kumar | H04L 47/782 |
| 10,185,601 B2* | 1/2019 | Syed | G06F 9/541 |
| 2002/0147962 A1* | 10/2002 | Hatanaka | G06F 8/70 717/102 |
| 2003/0214525 A1* | 11/2003 | Esfahany | G06F 9/5061 715/700 |
| 2008/0185448 A1* | 8/2008 | Kim | F24F 11/30 236/51 |
| 2012/0116561 A1* | 5/2012 | Nakagawa | G05B 19/0426 700/97 |
| 2013/0304788 A1* | 11/2013 | DeLuca | G06F 8/61 709/201 |
| 2015/0067147 A1 | 3/2015 | Carmel et al. | |
| 2015/0301877 A1 | 10/2015 | Roth et al. | |
| 2016/0034277 A1* | 2/2016 | Syed | G06F 8/76 717/136 |
| 2016/0124742 A1* | 5/2016 | Rangasamy | H04L 47/70 |
| 2017/0046146 A1 | 2/2017 | Jamjoon et al. | |
| 2017/0111241 A1 | 4/2017 | Degioanni | |
| 2017/0364434 A1* | 12/2017 | Kairali | G06F 11/3668 |
| 2018/0069806 A1* | 3/2018 | Kumar | H04L 47/782 |
| 2018/0081740 A1* | 3/2018 | Syed | G06F 8/76 |
| 2018/0113799 A1* | 4/2018 | M.V. | G06F 11/3684 |
| 2018/0136931 A1* | 5/2018 | Hendrich | G06F 11/302 |
| 2018/0189038 A1* | 7/2018 | Hart | G06F 8/76 |
| 2018/0189039 A1* | 7/2018 | Hart | G06F 8/76 |
| 2018/0336207 A1* | 11/2018 | Dunne | G06F 16/35 |
| 2018/0357055 A1* | 12/2018 | Apte | G06F 8/73 |
| 2018/0365008 A1* | 12/2018 | Chandramouli | G06F 8/65 |
| 2018/0373765 A1* | 12/2018 | Kaliavaradhan | G06F 16/28 |
| 2019/0102230 A1* | 4/2019 | Buckley | G06F 9/5055 |

OTHER PUBLICATIONS

Bakshi, Kapil. "Microservices-based software architecture and approaches." 2017 IEEE Aerospace Conference. IEEE, 2017. (Year: 2017).*

GitHub, "Acme Air Sample and Benchmark (wasperf version)", available at: https://hithub.com/blueperf/acmeair . . . , last downloaded Jul. 13, 2017, 2 pages.

Zaymus, Mikulas, "Decomposition of Monolithic Web Application to Microservices", JAMK University of Applied Sciences, School of Technology, Communication and Transport Degree Programme in Information and Communications Technology, May 2017, 58 pages.

De Santis, et al., "Evolve the Monolith to Microservices with Java and Node", IBM Redbooks, International Technical Support Organization, Dec. 2016, 132 pages.

Flow,Visualize Java Code Execution, "A Better Way to Understand Your Java Applications", available at: http://findtheflow, last downloaded Jul. 13, 2017, pp. 1-5.

Mazlami, et al., "Extraction of Microservices from Monolithic Software Architectures", Software Evolution and Architecture Lab, Department of Informatics University of Zurich, IEEE, Jun. 2017, 8 pages.

"Welcome to the pfff Wiki!", available at: https://github.com/facebook/pfff/wiki/Main, Aug. 2015, pp. 1-8.

Jones, Taylor, "So You're Thinking of Decomposing Your Monolith into Microservices", via@codeship, May 2015, pp. 1-64.

Levcovitz, et al., "Towards a Technique for Extracting Microservices from Monolithic Enterprise Systems", arXiv:1605.03175v1 [cs.SE], May 2016, 8 pages.

Escobar, et al., "Towards the Understanding and Evolution of Monolithic Applications as Microservices", IEEE, Jan. 2016, 11 pages.

Microsoft, "Visual Studio IDE, Code Editor, Team Services, & Mobile Center", available at: https://www.visualstudio.com, pp. 1-3, last downloaded Jul. 14, 2017.

* cited by examiner

DECOMPOSING MONOLITHIC APPLICATION INTO MICROSERVICES

BACKGROUND

Technical Field

The present invention relates generally to information processing and, in particular, to decomposing a monolithic application into microservices.

Description of the Related Art

Microservices are getting increasingly popular as a novel software architecture. In the microservice architecture, a monolithic application is decomposed into small components, also referred to as "microservices". Each microservice communicates with other microservices usually with a Hypertext Transfer Protocol (HTTP) resource Application Programming Interface (API).

The microservice architecture enables more agile development because each microservice is independently developable and deployable. A common development style is to implement a monolithic application first, and then decompose the monolithic application into microservices.

However, it is not a trivial task to decompose a monolithic application into microservices. For example, there is a need to understand the details of the functions (services) inside the application. When splitting a monolithic application manually (e.g., designing microservices using a pen and paper), the developer may decompose a function into microservices unnecessarily, or overlook a function that should be decomposed into microservices. Additionally, there is a need to understand the function call contexts inside the application. If a developer decompose functions into multiple microservices that communicate tightly with each other, the overall performance of the application may dramatically degrade due to the inter-service communication by HTTP API.

Thus, there is a need for an improved mechanism for transforming a monolithic application into microservices.

SUMMARY

According to an aspect of the present invention, a computer-implemented method is provided for transforming a monolithic application into a set of microservices. The method includes grouping, by a processor, classes and methods of the monolithic application into clusters. Each of the clusters corresponds to a respective one of the microservices. The method further includes determining, by the processor for each of the classes and the methods in the clusters, a number of function calls thereto and therefrom. The method also includes presenting, by a display device to a user, four processing options for at least the one of the classes and the methods in the clusters that has a maximum value for the number of functions calls thereto and therefrom compared to other ones of the classes and the methods. The four processing options include: (1) create a new cluster with the at least of the classes and the methods; (2) merge the at least one of the classes and the methods into a different cluster; (3) duplicate the at least one of the classes and the methods into all of the clusters that have caller or callee classes or methods from among the classes and the methods; and (4) remain the at least one of the classes and the methods. The method additionally includes processing, by the processor, the at least one of the classes and the methods in accordance with and responsive to a user selection of one of the four processing options.

According to another aspect of the present invention, a computer program product is provided for transforming a monolithic application into a set of microservices. The computer program product includes a non-transitory computer readable storage medium having program instructions embodied therewith. The program instructions are executable by a computer to cause the computer to perform a method. The method includes grouping, by a processor, classes and methods of the monolithic application into clusters. Each of the clusters corresponds to a respective one of the microservices. The method further includes determining, by the processor for each of the classes and the methods in the clusters, a number of function calls thereto and therefrom. The method also includes presenting, by a display device to a user, four processing options for at least the one of the classes and the methods in the clusters that has a maximum value for the number of functions calls thereto and therefrom compared to other ones of the classes and the methods. The four processing options include: (1) create a new cluster with the at least of the classes and the methods; (2) merge the at least one of the classes and the methods into a different cluster; (3) duplicate the at least one of the classes and the methods into all of the clusters that have caller or callee classes or methods from among the classes and the methods; and (4) remain the at least one of the classes and the methods. The method additionally includes processing, by the processor, the at least one of the classes and the methods in accordance with and responsive to a user selection of one of the four processing options.

According to yet another aspect of the present invention, a computer processing system is provided for transforming a monolithic application into a set of microservices. The computer processing system includes a processor. The processor is configured to group classes and methods of the monolithic application into clusters. Each of the clusters corresponds to a respective one of the microservices. The processor is further configured to determine, for each of the classes and the methods in the clusters, a number of function calls thereto and therefrom. The computer processing system further includes a display device, configured to present to a user four processing options for at least the one of the classes and the methods in the clusters that has a maximum value for the number of functions calls thereto and therefrom compared to other ones of the classes and the methods. The four processing options include: (1) create a new cluster with the at least of the classes and the methods; (2) merge the at least one of the classes and the methods into a different cluster; (3) duplicate the at least one of the classes and the methods into all of the clusters that have caller or callee classes or methods from among the classes and the methods; and (4) remain the at least one of the classes and the methods. The processor is further configured to process the at least one of the classes and the methods in accordance with and responsive to a user selection of one of the four processing options.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to transforming and/or otherwise decomposing a monolithic application into microservices. Accordingly, the terms "transform" and "decompose" and forms thereof are used interchangeably herein to refer to a technique for obtaining, from a monolithic operation, a set of microservices that essentially form and/or are otherwise involved in the monolithic operation.

Figure 1:
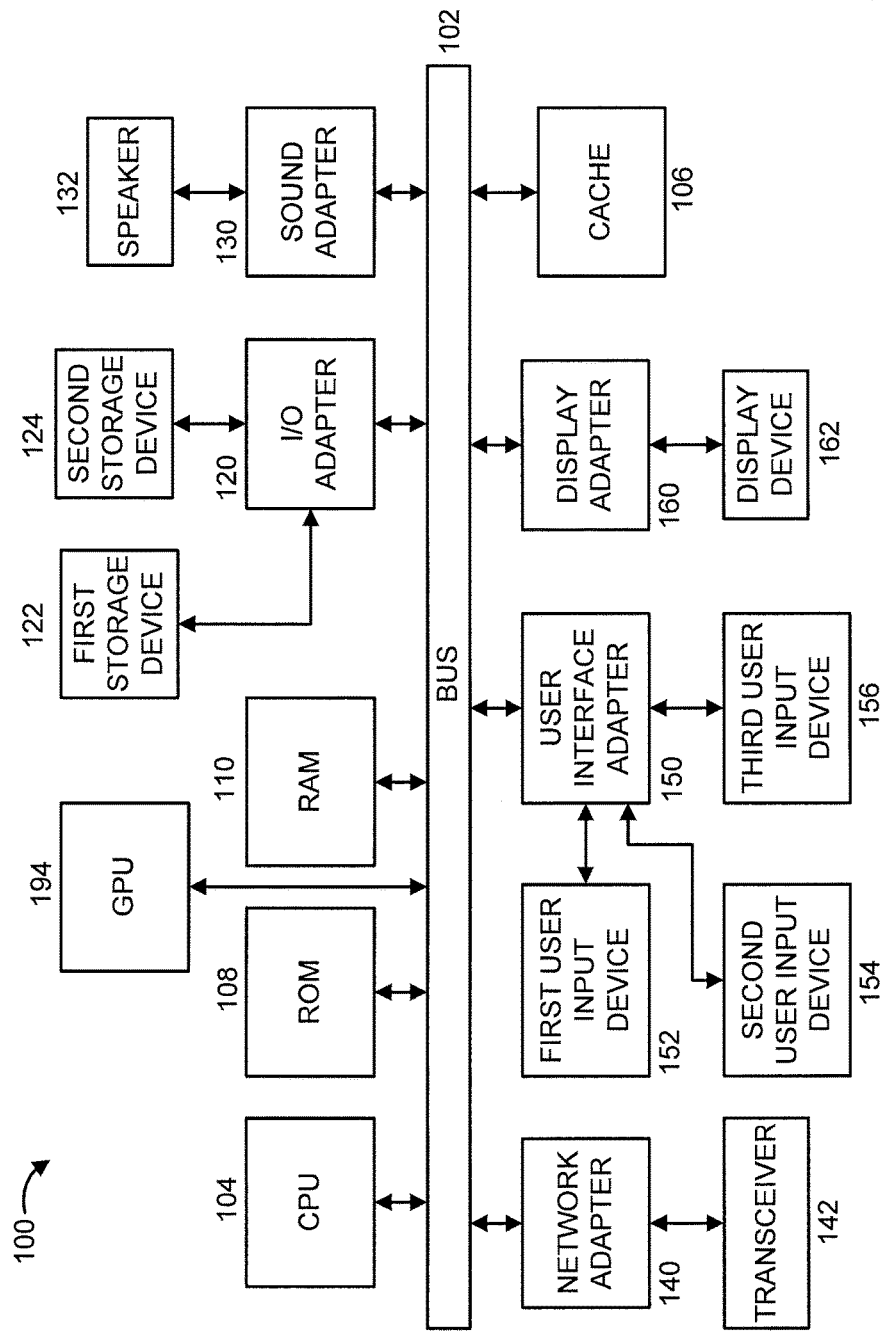
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
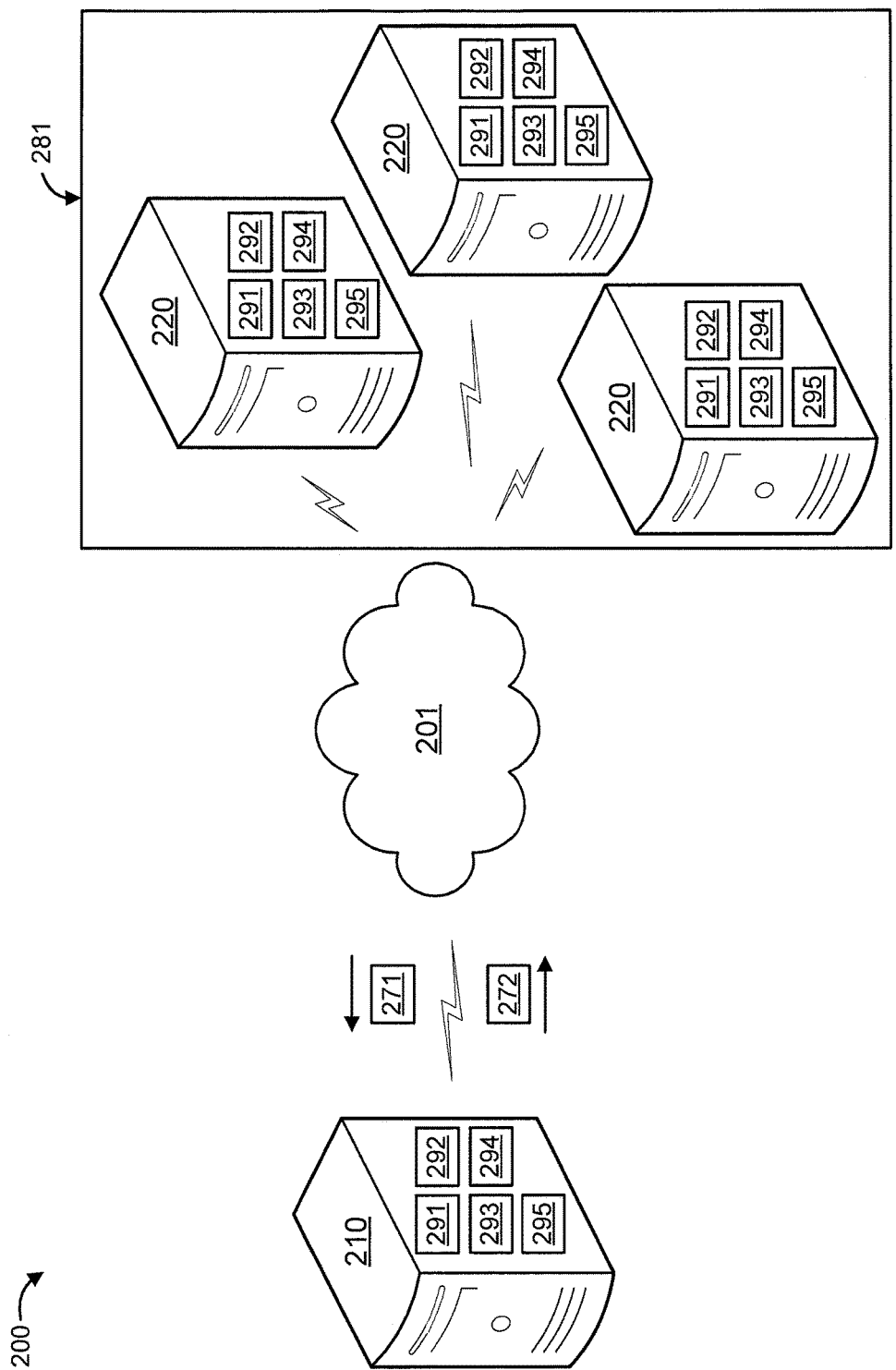
FIG. 2 shows an exemplary system to which the present invention can be applied, in accordance with an embodiment of the present invention.

Moreover, it is to be appreciated that system 200 described below with respect to FIG. 2 is a system for implementing respective embodiments of the present invention. Part or all of processing system 100 may be implemented in one or more of the elements of system 200.

Figure 3:
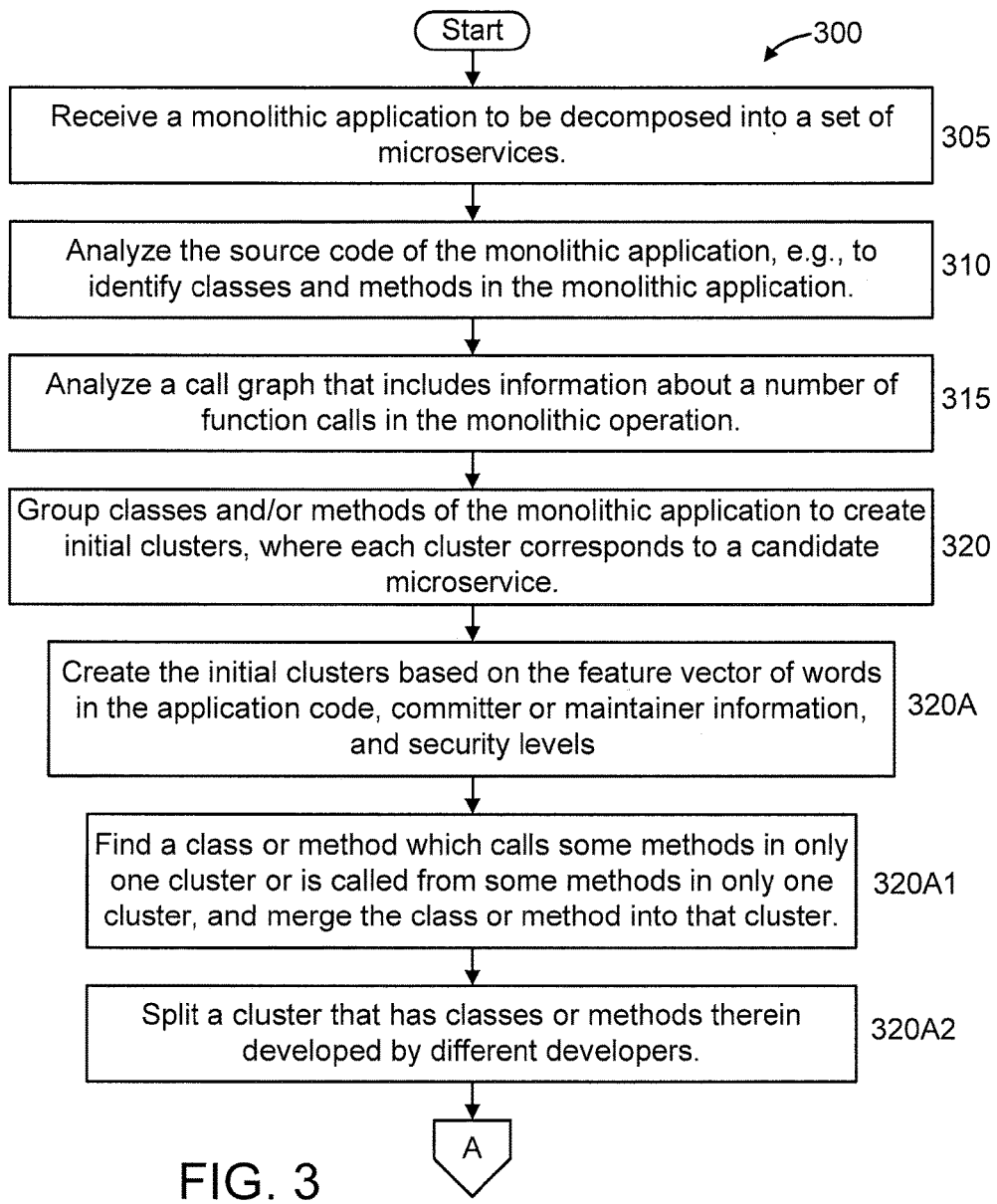
FIGS. 3-5 show an exemplary method for decomposing a monolithic application into a set of microservices, in accordance with an embodiment of the present invention.
Figure 4:
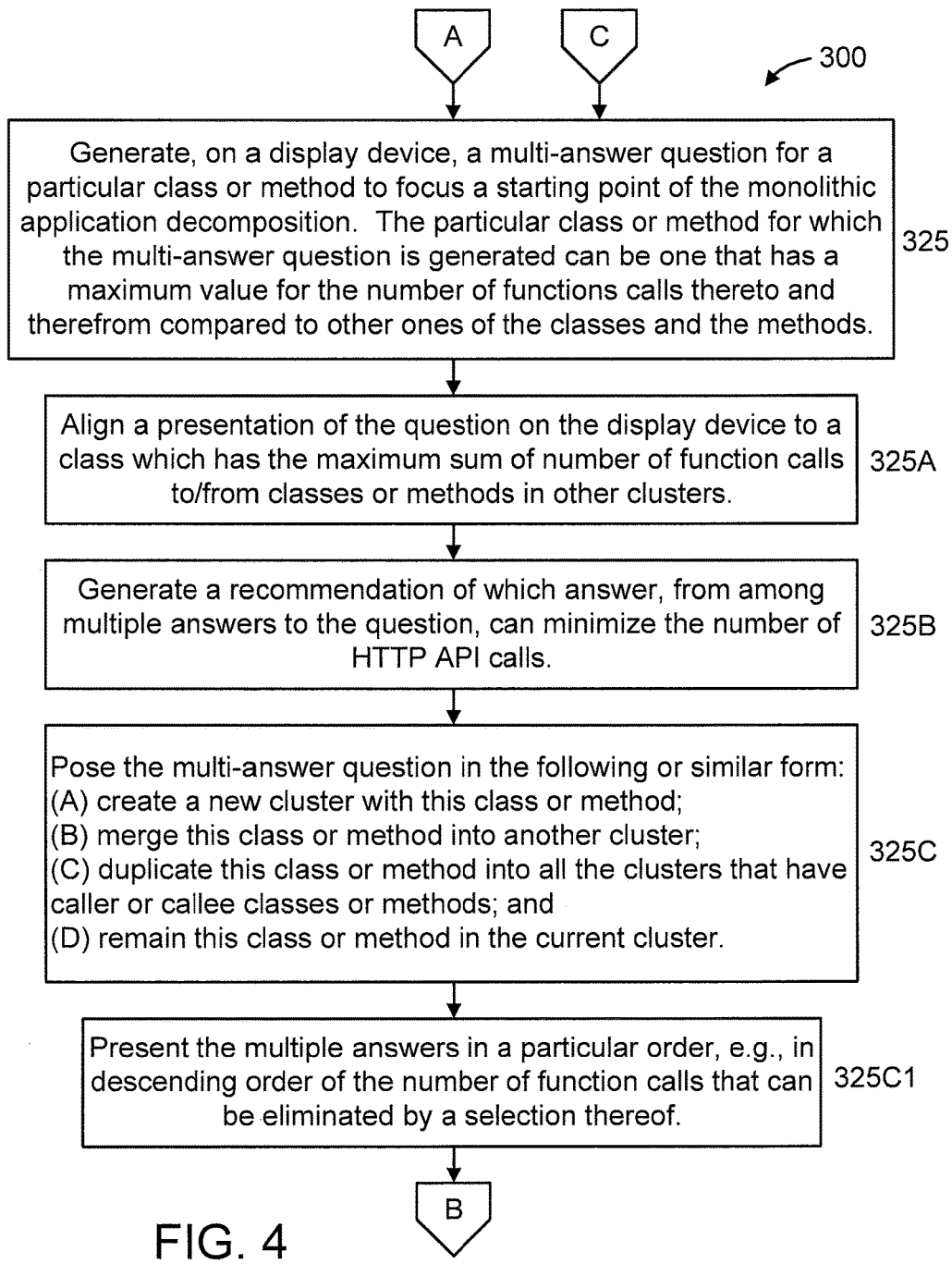
Figure 5:
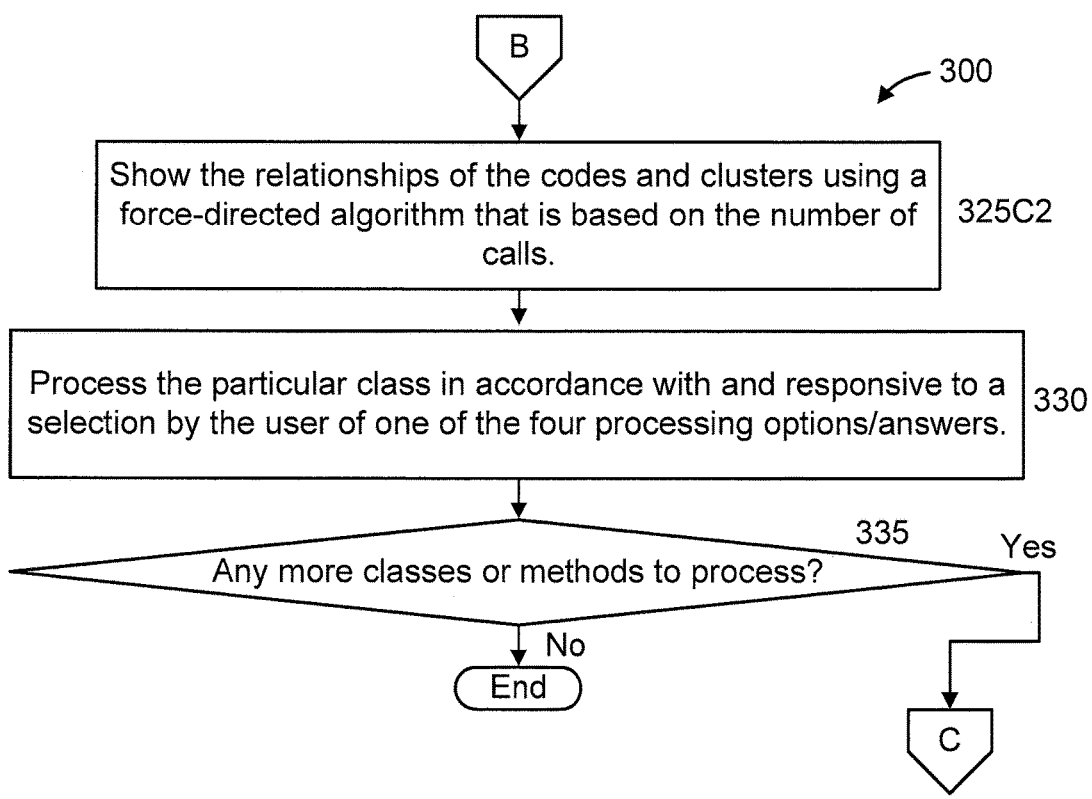
Figure 7:
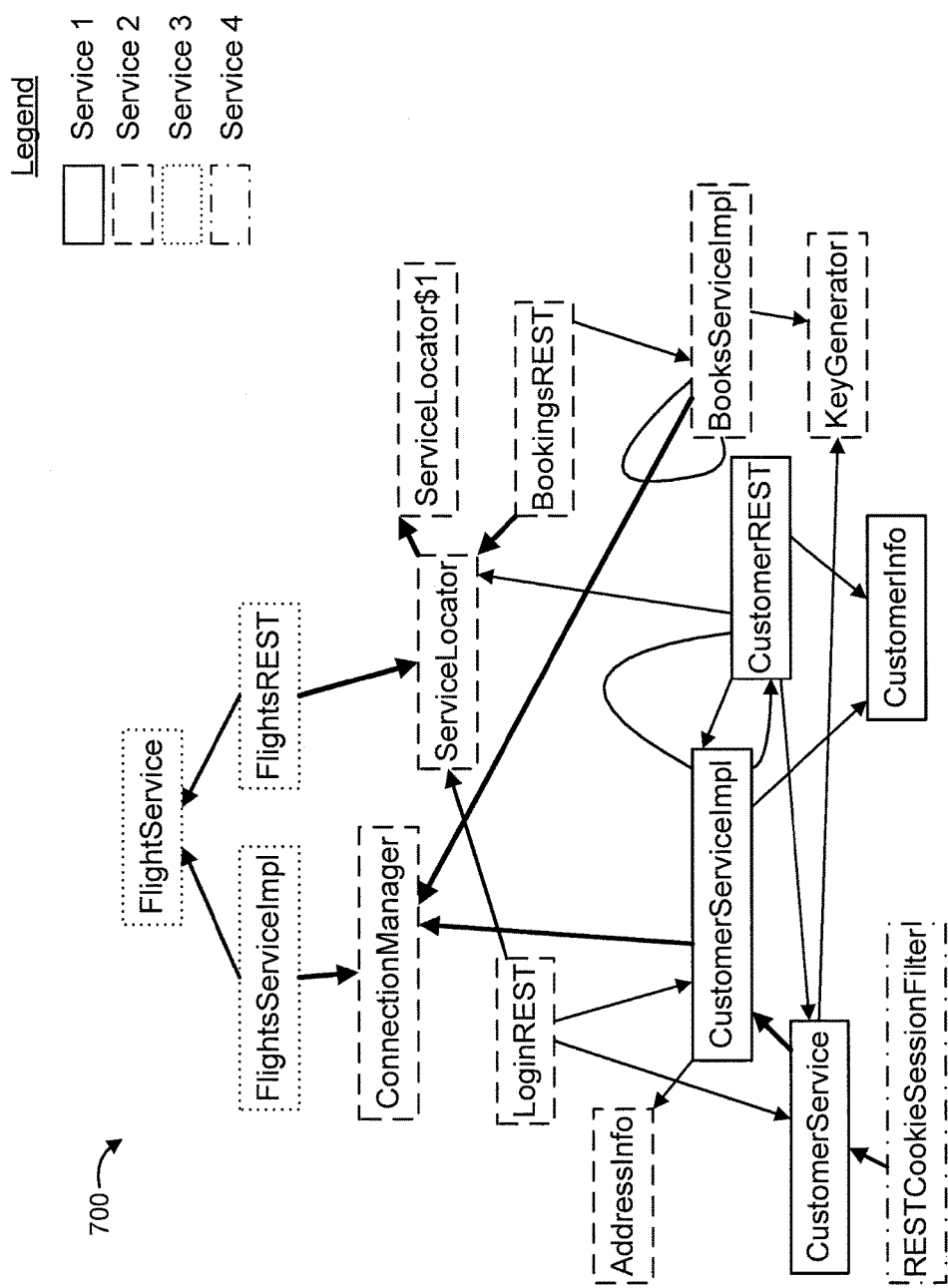
FIG. 7 shows an exemplary initial clustering derived from a monolithic application relating to a step of the method of FIG. 3, in accordance with an embodiment of the present invention.
Figure 8:
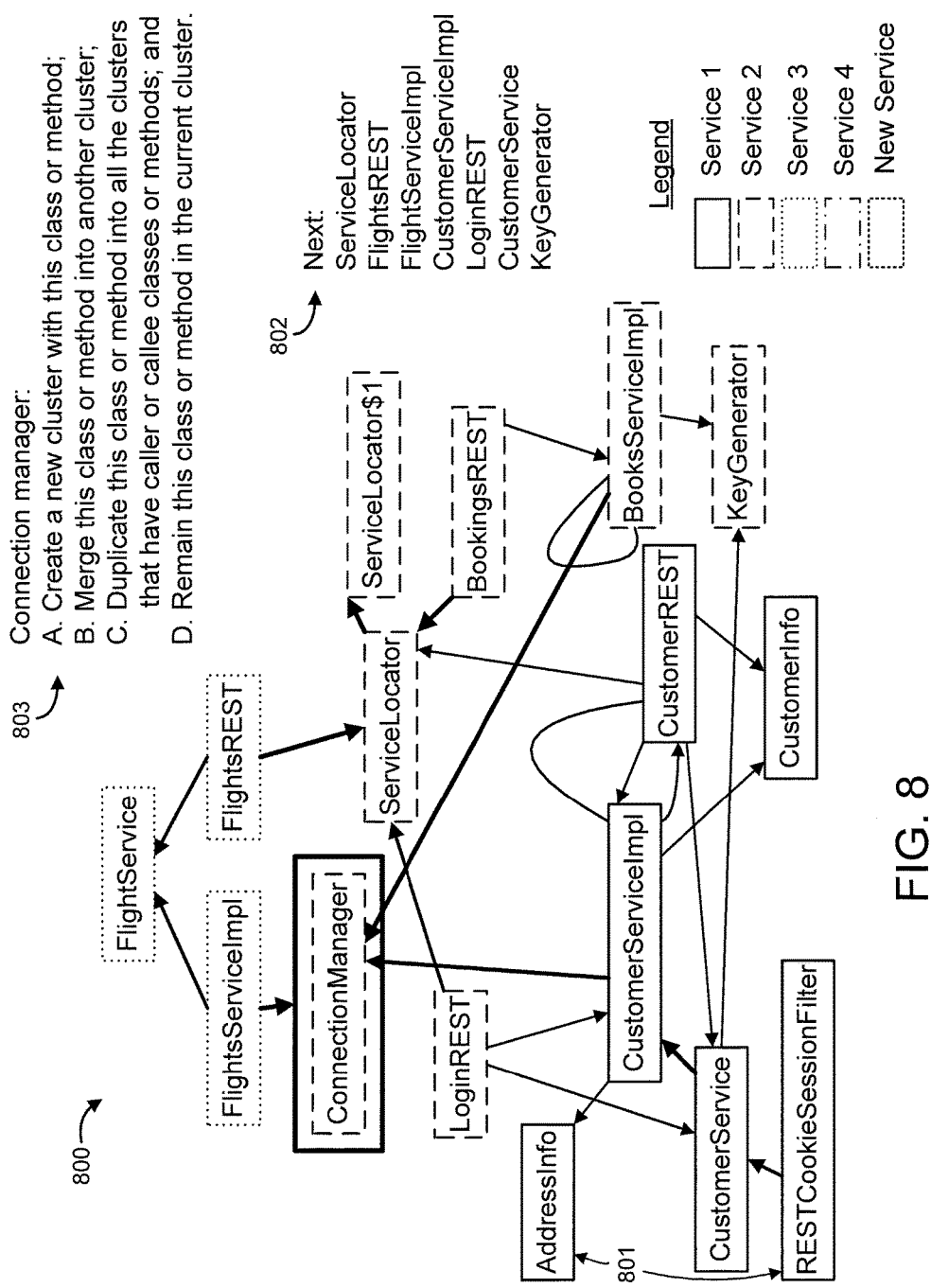
FIG. 8 shows exemplary processing of a monolithic application relating to one or more of steps of the method of FIG. 3, in accordance with an embodiment of the present invention.
Figure 9:
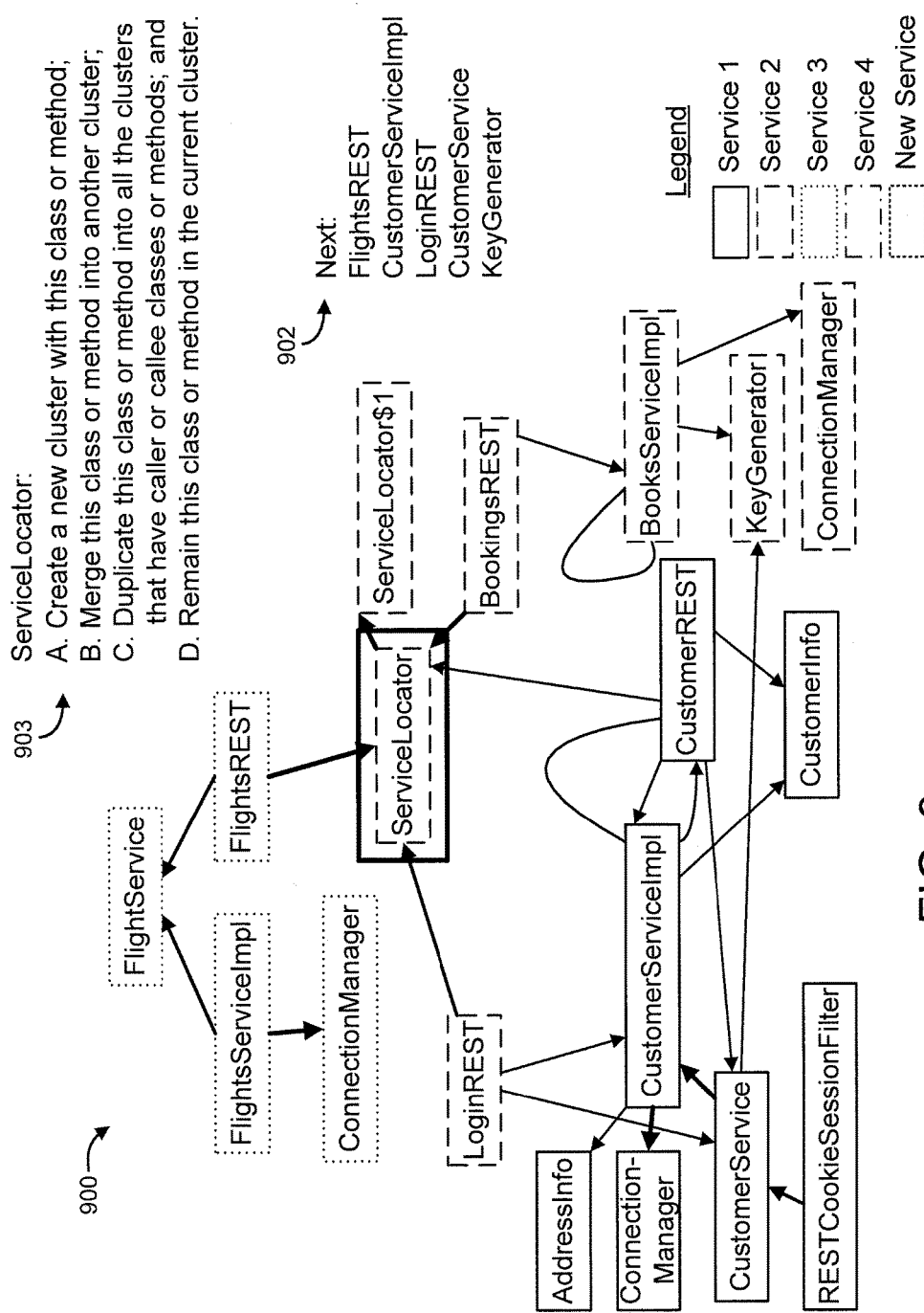
FIG. 9 shows exemplary further processing of a monolithic application relating to one or more of steps of the method of FIG. 3, in accordance with an embodiment of the present invention.
Figure 10:
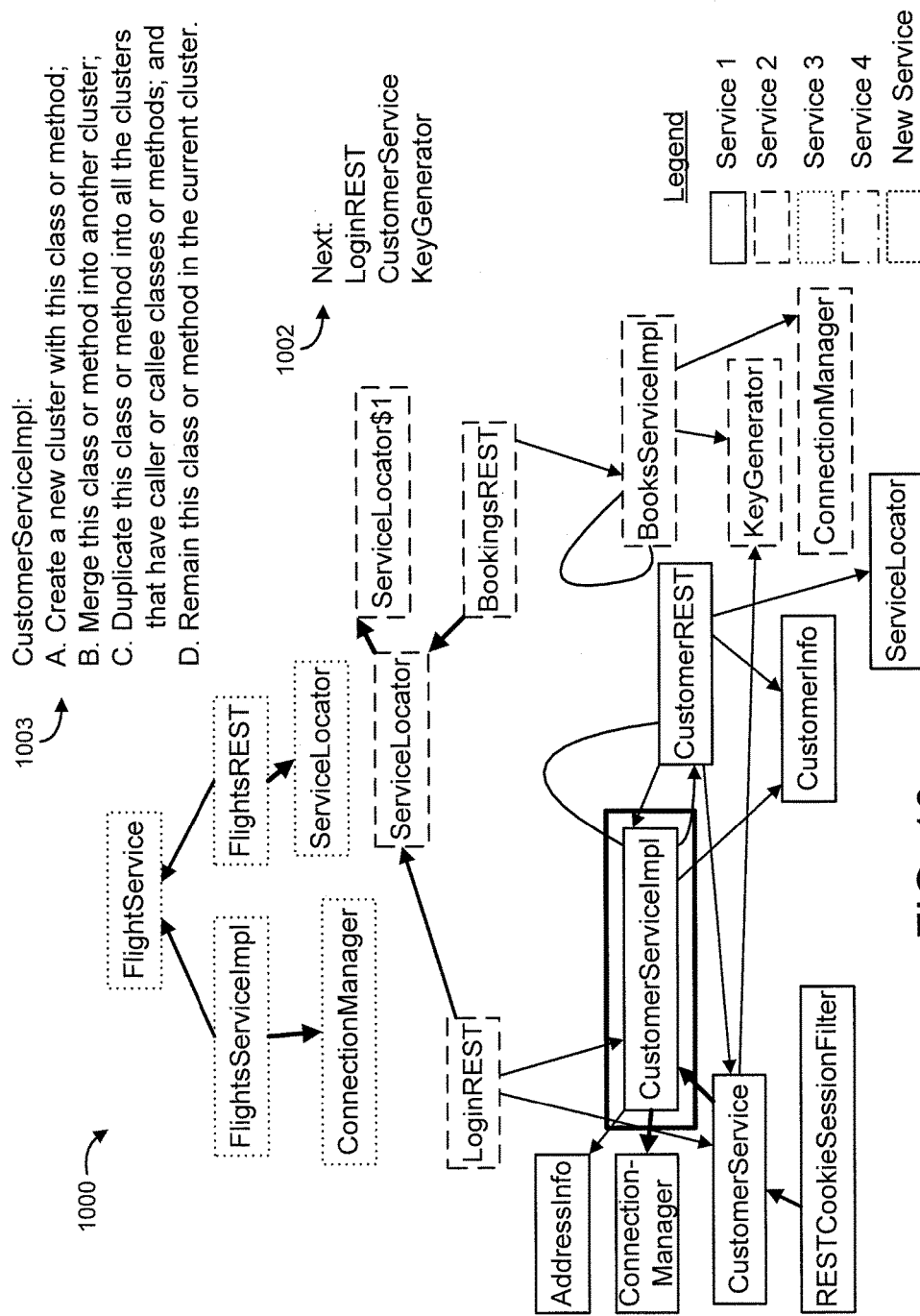
FIG. 10 shows exemplary additional processing of a monolithic application relating to one or more of steps of the method of FIG. 3, in accordance with an embodiment of the present invention.

Further, it is to be appreciated that part or all of processing system 100 an/or system 200 may perform at least part of the methods and/or processing described herein including, for example, at least part of method 300 of FIGS. 3-5 and/or at least part of the initial clustering 700 of FIG. 7 and/or at least part of the processing 800 of FIG. 8 and/or at least part of the further processing 900 of FIG. 9 and/or at least part of the additional processing 1000 of FIG. 10.

FIG. 2 shows an exemplary system 200 to which the present invention can be applied, in accordance with an embodiment of the present invention. The system 200 includes a computer processing system 210 (e.g., computer processing system 100) and a set of other computer processing systems 220. In an embodiment, one or more of the computer processing systems 210 and 220 can be configured as servers.

The computer processing system 210 can be configured to receive a monolithic application 271 from any of the other computer processing systems 220 (or already have it stored thereon). The computer processing system 210 can subject the monolithic application 271 to a decomposition technique for decomposing the monolithic application 271 into a set of microservices 272 based on the present invention. The microservices 272 obtained from the decomposition technique can then be provided from the computer processing system 210 to one or more of the other computer processing systems 220 (or can be used by computer processing system 210 itself). In this way, the constituent microservices 272 involved in a monolithic application 271 can be determined and provided/utilized as needed.

Each of the computer processing system 210 and the other computer processing systems 220 at least include a processor 291, a memory 292, a transceiver 293, a user interface 294, and a display 295. The memory 292 in any of the systems 210 and 220 can be implemented using one or more databases. The memory 292 can store monolithic applications and/or microservices decomposed from monolithic applications in accordance with the present invention. The processor 291 is used to perform the decomposition. The processor 291 can be a CPU, a GPU, and so forth, as readily appreciated by one of ordinary skill in the art, given the teachings of the present invention provided herein. The display device 295 can be used to display information to a user relating to the present invention. The user interface 294 can be used by a user to interact with the system. The transceivers 293 of the other computer processing systems 220 send the monolithic applications to the transceiver 293 of the computer processing system 210. The processor 291 and memory 292 of the computer processing system 210 then process the monolithic applications to decompose each of the monolithic applications into a respective set of microservices and provide one or more of the sets to one or more of the other computer processing systems 220 via the transceivers 293. For the sake of illustration, FIG. 2 shows computer processing system 210 receiving a monolithic application 271 and outputting a set of microservices 272 corresponding to the monolithic application. However, as noted herein, other arrangements are possible, as readily appreciated by one of ordinary skill in the art given the teachings of the present invention provided herein.

In an embodiment, computer processing system 220 can be part of another system 281. In an embodiment, the system 281 can have various nodes from which to provide various microservices. For example, each computer processing system can correspond to a cluster/node of a distributed system that provide various microservices from various ones of the clusters/nodes. In an embodiment, the system can be a cloud system, where the microservices can be implemented using a cloud configuration that provides and/or makes available only the needed/desired/contracted micro services to computer processing system 210 so as to avoid the need for accessing and executing the complete monolithic application, this freeing processing and memory resources including: use/consumption; and their overhead of operation. Additionally, the need to integrate an entire monolithic operation is avoided, such that only the one or more microservices need be integrated, thus, minimizing developer overhead, etc.

Hence, in an embodiment, each of the computer processing systems 220 can be considered to correspond to a respective cluster/node of a distributed computer system. In this way, distance, link reliability, and other factors can be considered as far as which of the systems 220 can provide needed microservices. These and other configurations and implementations of the present invention are readily determined by one of ordinary skill in the art, while maintaining the spirit of the present invention.

In the embodiment shown in FIG. 2, the elements thereof are interconnected by a network(s) 201. However, in other embodiments, other types of connections can also be used. Moreover, in an embodiment, at least one of the elements of system 200 is processor-based (in the shown example, all are processor-based). Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present invention provided herein, while maintaining the spirit of the present invention.

FIGS. 3-5 show an exemplary method 300 for decomposing a monolithic application into a set of microservices, in accordance with an embodiment of the present invention.

Referring to FIG. 3, at step 305, receive a monolithic application to be decomposed into a set of microservices.

At step 310, analyze the source code of the monolithic application, e.g., to identify classes and methods in the monolithic application.

At step 315, analyze a call graph that includes information about a number of function calls in the monolithic operation.

At step 320, group classes and/or methods of the monolithic application to create initial clusters, where each cluster corresponds to a candidate microservice. Hence, at the conclusion of step 320, each item in the monolithic application will belong to only one of the clusters, and not to multiple clusters.

In an embodiment, step 320 includes one or more of steps 320A-B.

At step 320A, create the initial clusters based on the feature vector of words in the application code (e.g., the names of classes), committer or maintainer information, and security levels. The committer or maintainer information can include, for example, the name of the committer or maintainer; the organization of the committer or maintainer, commit data for the application, and so forth. It is to be appreciated that the preceding items are illustrative and, thus, other examples of the same can also be used in accordance with the teachings of the present invention, while maintaining the spirit of the present invention.

In an embodiment, step 320A can include one or more of steps 320A1-A2.

At step 320A1, find a class or method which calls some methods in only one cluster or is called from some methods in only one cluster, and merge the class or method into that cluster.

At step 320A2, split a cluster that has classes or methods therein developed by different developers.

Referring to FIG. 4, at step 325, generate, on a display device, a multi-answer question for a particular class or method to focus a starting point of the monolithic application decomposition. The multi-answer question allows for the present invention to ultimately obtain a better microservice decomposition starting from initial clusters. In an embodiment, the particular class or method for which the multi-answer question is generated can be one that has a maximum value for the number of functions calls thereto and therefrom compared to other ones of the classes and the methods.

In an embodiment, step 325 includes one or more of steps 325A-B.

At step 325A, align a presentation of the question on the display device to a class which has the maximum sum of number of function calls to/from classes or methods in other clusters.

At step 325B, generate a recommendation of which answer, from among multiple answers to the question, can minimize the number of HTTP API calls.

At step 325C, pose the multi-answer question in the following or similar form:
(A) create a new cluster with this class or method;
(B) merge this class or method into another cluster;
(C) duplicate this class or method into all the clusters that have caller or callee classes or methods; and
(D) remain this class or method in the current cluster.

As is evident to one of ordinary skill in the art, each of these answers (A-D) can be considered to be representative of a process. Hence, answer (A) can be considered to be representative of a "process (A)", answer (B) can be considered to be representative of a "process (B), and so forth. Accordingly, the terms "answer (A)" and "process (A)" are used interchangeably herein, the terms "answer (B)" and "process (B) are used interchangeably herein, and so forth.

Accordingly, the preceding answers (A)-(D) could be rephrased as follows in (A')-(D'), which is described in terms of microservices:
(A') make this class or method an individual service itself;
(B') move this class or method to another service;
(C') move this class or method to the other services that call this or are called by this; and
(D') keep this class or method in the current service.

In an embodiment, step 325C can include one or more of steps 325C1-C2.

At step 325C1, present the multiple answers in a particular order. For example, the order of the multiple answers set forth in step 325C are in descending order of the number of function calls that can be eliminated by a selection thereof. Of course, other orders or randomness can be used for answer presentation order.

Referring to FIG. 5, at step 325C2, show the relationships of the codes and clusters using a force-directed algorithm that is based on the number of calls. The relationships can be shown to the user using a display device.

At step 330, process the particular class in accordance with and responsive to a selection by the user of one of the four processing options/answers.

At step 335, determine whether there are any more classes or methods to process. If so, then return to step 325 to process the next class or method. Otherwise, the method is terminated.

In an embodiment, the method can recalculate the recommendation dynamically after a user answers a question.

Figure 6:
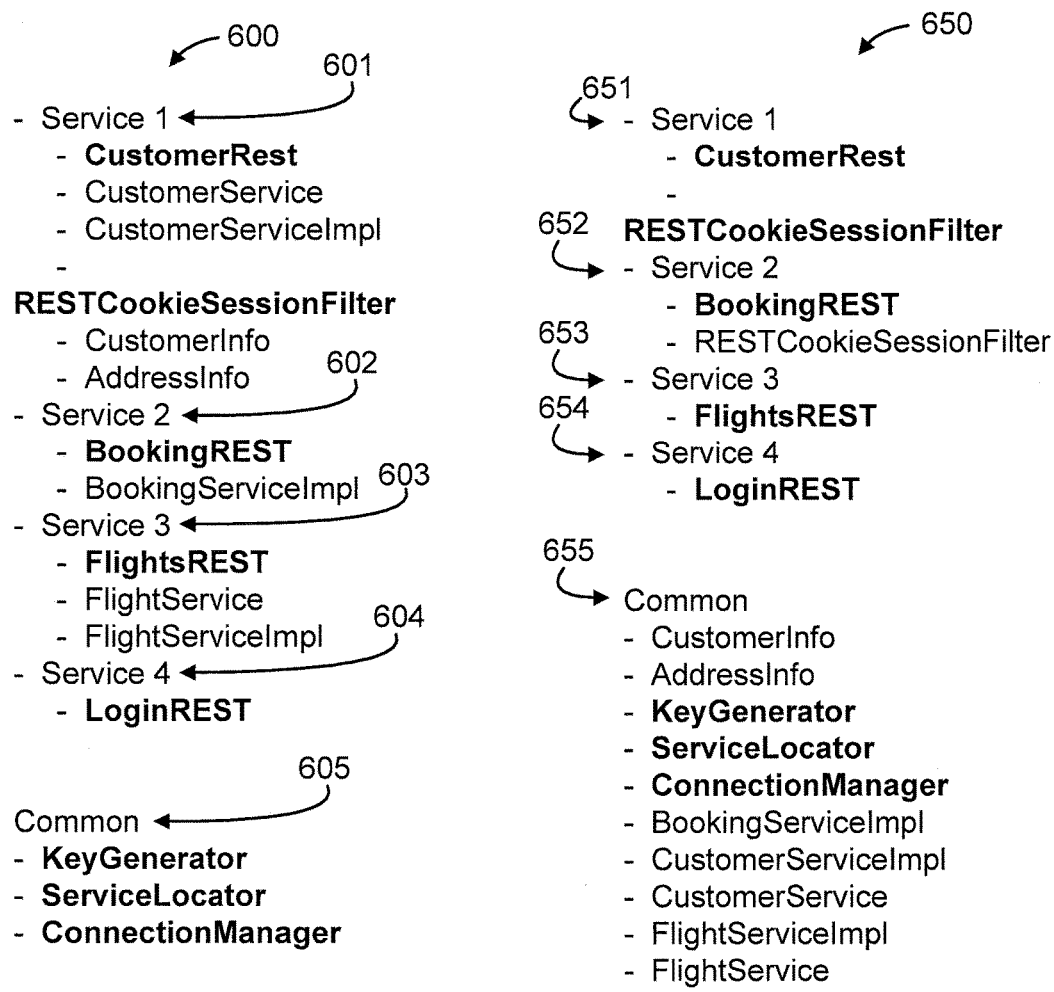
FIG. 6 shows an exemplary human-based microservices decomposition and a computer-based microservices decomposition derived in accordance with an embodiment of the present invention.

FIG. 6 shows an exemplary human-based microservices decomposition 600 and a computer-based microservices decomposition 650 derived in accordance with an embodiment of the present invention. The computer-based microservices decomposition 650 provides a better decomposition as compared to the human-based microservices decomposition 600. For example, computer-based microservices decomposition 650 correctly grouped some classes into microservices that were not considered as microservices in the human-based microservices decomposition 600. Hence, the present invention can generate an appropriate microservice design from a monolithic design before commencing the actual work of decomposition.

The human-based microservices decomposition 600 includes a service 1 601, a service 2 602, a service 3 603, a service 4 604, and common items 605.

Service 1 601 includes the following microservices: CustomerREST; and RESTCookieSessionFilter.

Service 2 602 includes the following microservices: BookingREST; and RESTCookieSessionFilter.

Service 3 603 includes the following microservices: FlightsREST.

Service 4 604 includes LoginREST.

Common items 605 include the following: CustomerInfo; Address Info; KeyGenerator; ServiceLocator; ConnectionManager; BookingServiceImpl; CustomerServiceImpl; CustomerService; FlightServiceImpl; and FlightService.

The computer-based microservices decomposition 650 includes a service 1 651, a service 2 652, a service 3 653, a service 4 654, and common items 655.

Service 1 651 includes the following microservices: CustomerREST; CustomerService; CustomerServiceImpl; RESTCokieSessionFilter; CustomerInfo; and AddressInfo.

Service 2 652 includes the following microservices: BookingREST; and BookingServiceImpl.

Service 3 653 includes the following microservices: FlightsREST; FlightService; and FlightServiceImpl.

Service 4 654 includes the following microservices: LoginREST.

Common items 655 include the following: KeyGenerator; ServiceLocator; and ConnectionManager.

FIGS. 7-11 hereinafter show and describe examples of the various steps of method 300 of FIG. 3 for the sakes of illustration and clarity. The various microservices involved in FIGS. 7-11 are also those involved in the two decompositions 600 and 650 of FIG. 6. Each of FIGS. 7-11 include a legend specifying blocks having various line patterns corresponding to various different ones of the (micro) services of a monolithic application in order to identify which classes and/or methods correspond to which of the (micro) services. Each of the FIGS. 7-11 show a progression of the processing of a monolithic application in order to decompose the same into a set of microservices in relation to steps 325 to 335 of the method 300 of FIG. 3. Hence, FIGS. 7-11 can relate to a user interface to help developers decompose a monolithic application into microservices by interactively answering 4-choice questions about each class in a monolithic application.

FIG. 7 shows an exemplary initial clustering 700 derived from a monolithic application relating to step 325 of the method 300 of FIG. 3, in accordance with an embodiment of the present invention. In an embodiment, the initial clustering 700 can correspond to step 320 of method 300.

In the embodiment of FIG. 7, classes (in the monolithic application) are clustered using k-means, based on the appearance frequency of words as feature vectors. Of course, the present invention is not limited to solely k-means and, thus, other clustering techniques can also be used in accordance with the teachings of the present invention, while maintaining the spirit of the present invention.

FIG. 8 shows exemplary processing 800 of a monolithic application relating to one or more of steps 325 to 335 of the method 300 of FIG. 3, in accordance with an embodiment of the present invention.

The processing involves processes (A)-(C). In particular, FIG. 8 shows the following:
    results 801 of process (A);
    a sorted listing 802, sorted in process (B), that indicates the processing order for the remaining (i.e., yet to be processed) involved classes and/or methods of the monolithic application; and
    a presentation 803 of the multi-answer question, where process (C) is selected.

FIG. 9 shows exemplary further processing 900 of a monolithic application relating to one or more of steps 325 to 335 of the method 300 of FIG. 3, in accordance with an embodiment of the present invention. The further processing 900 relates to the case of selecting process (C) for the class (or method) ConnectionManager (as per FIG. 8). Moreover, FIG. 9 shows the following:
- a sorted listing 902, sorted in process (B), that indicates the processing order for the remaining (i.e., yet to be processed) involved classes and/or methods of the monolithic application; and
- a presentation 903 of the multi-answer question for the next class and/or method, namely ServiceLocator.

FIG. 10 shows exemplary additional processing 1000 of a monolithic application relating to one or more of steps 325 to 335 of the method 300 of FIG. 3, in accordance with an embodiment of the present invention. The additional processing 1000 relates to the case of selecting process (C) for the class (or method) ServiceLocator (as per FIG. 9). Moreover, FIG. 10 shows the following:
- a sorted listing 1002, sorted in process (B), that indicates the processing order for the remaining (i.e., yet to be processed) involved classes and/or methods of the monolithic application; and
- a presentation 1003 of the multi-answer question for the next class and/or method, namely CustomerServiceImpl.

Figure 11:
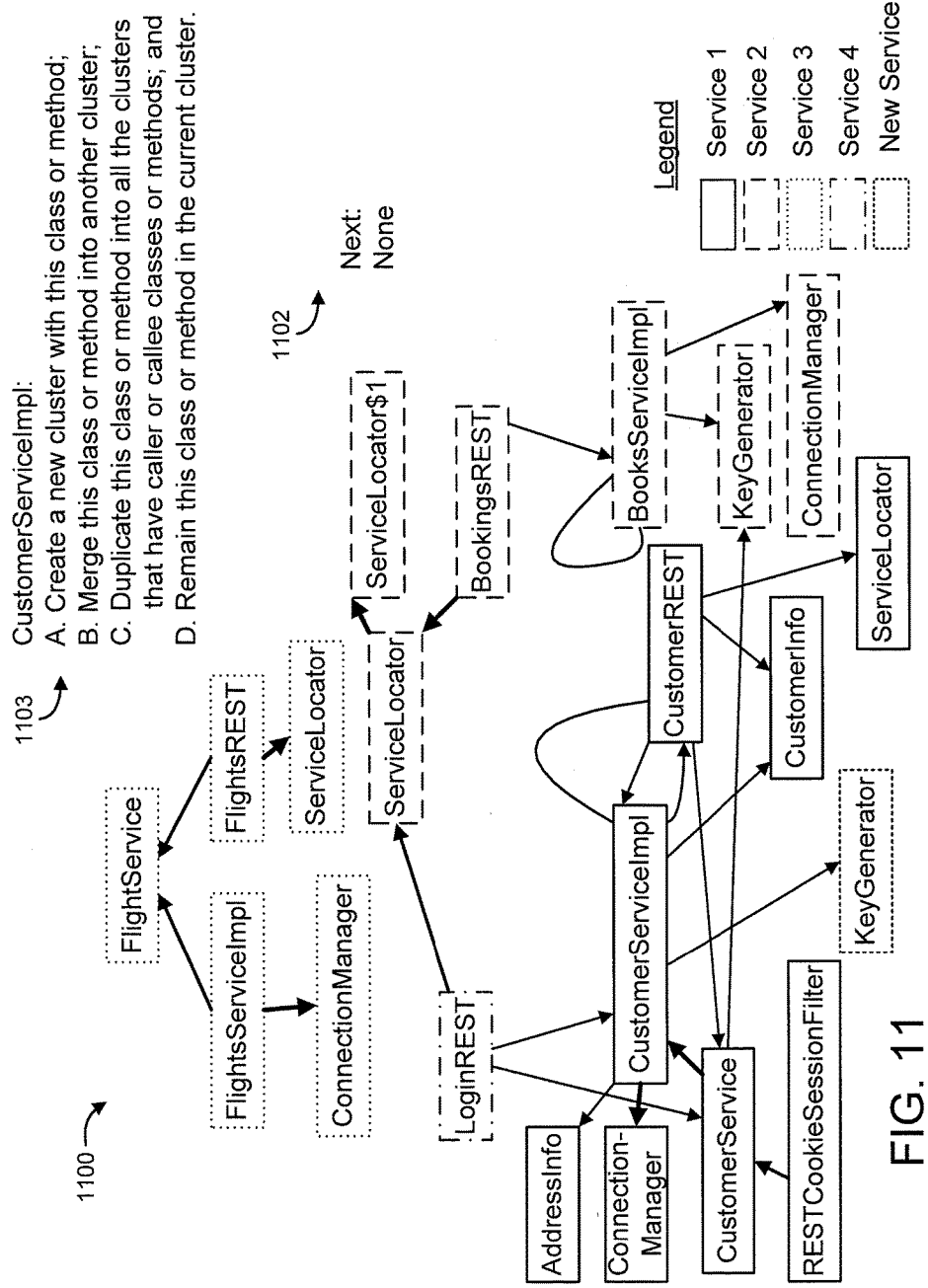
FIG. 11 shows exemplary further processing of a monolithic application relating to one or more of steps of the method of FIG. 3, in accordance with an embodiment of the present invention.

FIG. 11 shows exemplary further processing 1100 of a monolithic application relating to one or more of steps 325 to 335 of the method 300 of FIG. 3, in accordance with an embodiment of the present invention. The additional processing 1100 relates to the case of selecting process (A) for the class (or method) LoginREST. Moreover, FIG. 11 shows the following:
- a sorted listing 1102 that indicates the processing order for the remaining (i.e., yet to be processed) involved classes and/or methods of the monolithic application, which is now empty; and
- a presentation 1103 of the multi-answer question for the next class and/or method, namely "None" (that is, no more remain).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
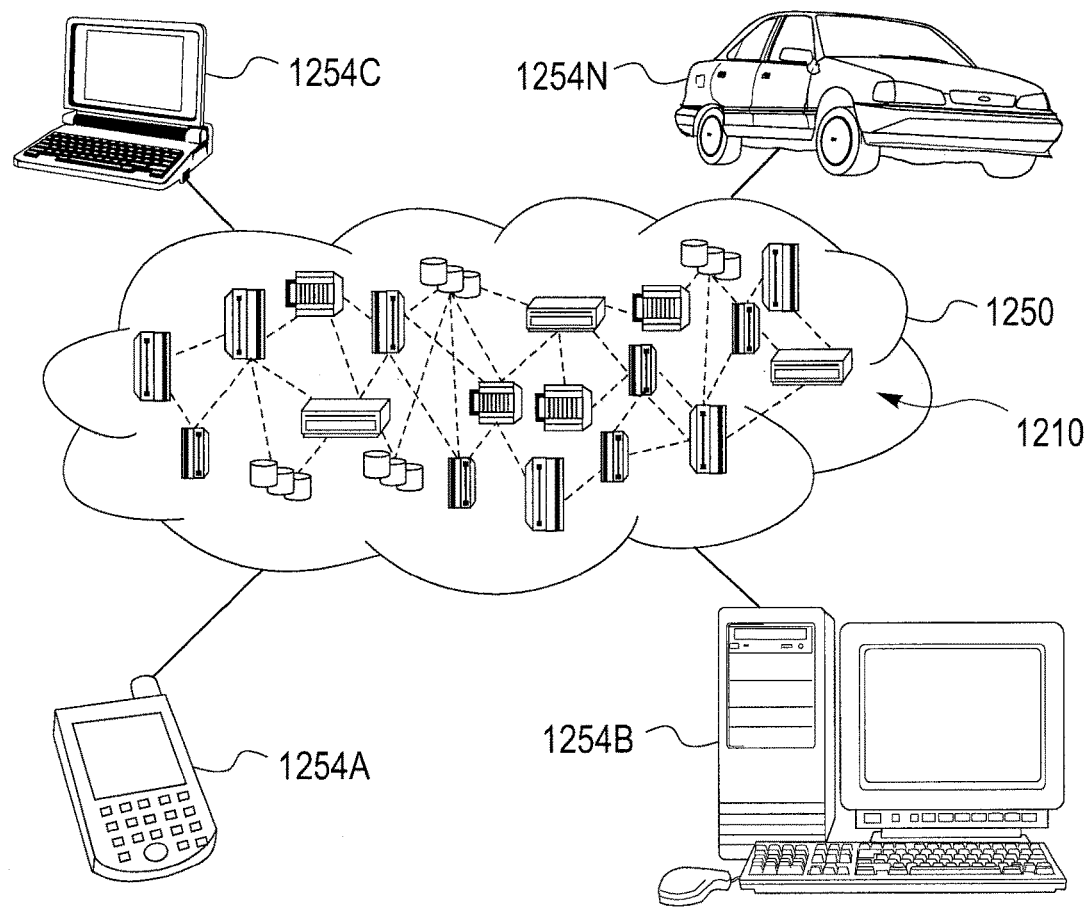
FIG. 12 shows a cloud computing environment, in accordance with an embodiment of the present invention.

Referring now to FIG. 12, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
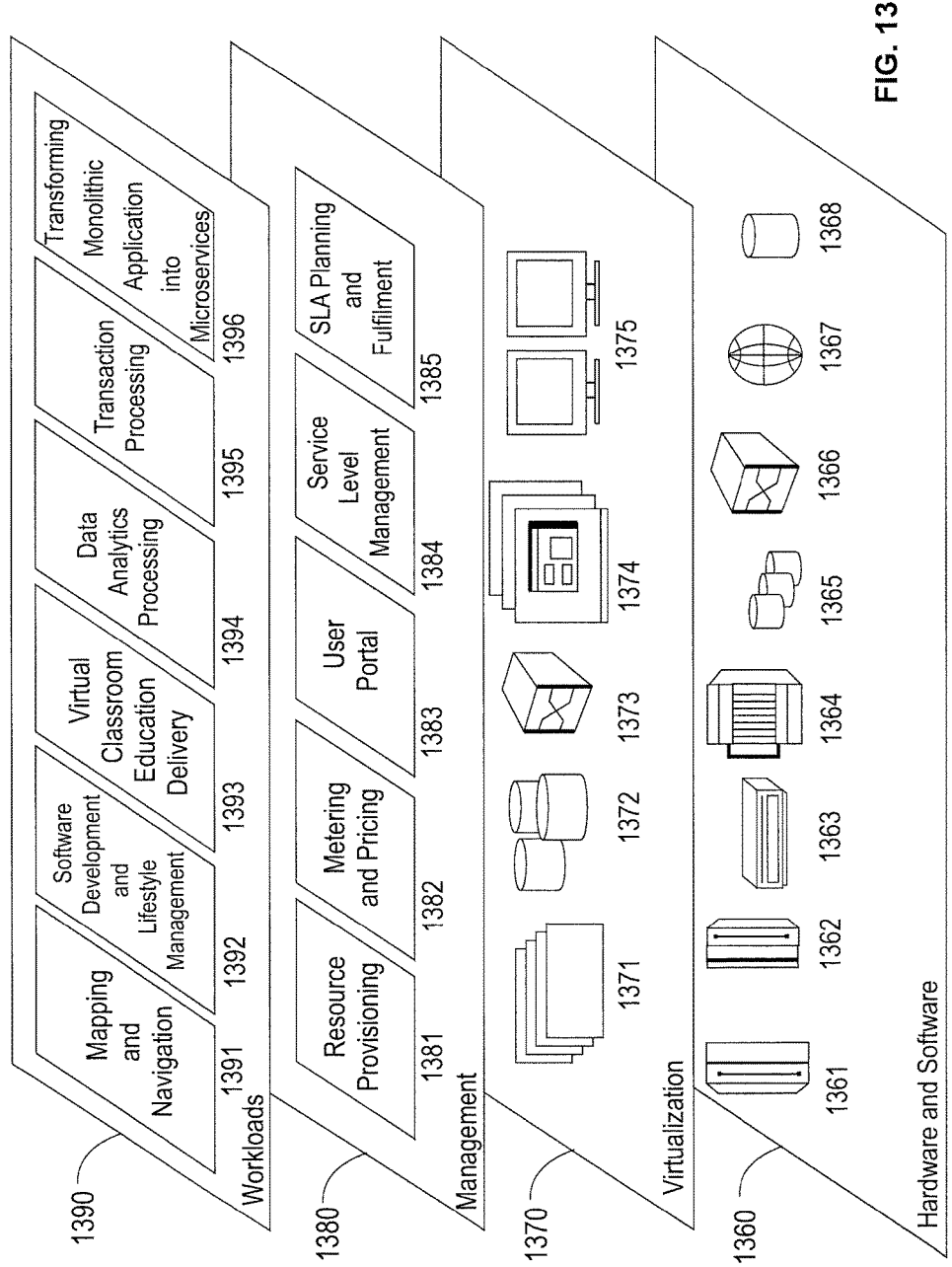
FIG. 13 shows abstraction model layers, in accordance with an embodiment of the present invention.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and transforming a monolithic application into microservices 1396.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for transforming a monolithic application into a set of microservices, the method comprising: grouping, by a processor, classes and methods of the monolithic application into clusters, each of the clusters corresponding to a respective one of the microservices; determining, by the processor for each of the classes and the methods in the clusters, a number of function calls thereto and therefrom; presenting, by a display device to a user, four processing options for at least the one of the classes and the methods in the clusters that has a maximum value for the number of functions calls thereto and therefrom compared to other ones of the classes and the methods, the four processing options comprising: (1) create a new cluster with the at least one of the classes and the methods; (2) merge the at least one of the classes and the methods into a different cluster; (3) duplicate the at least one of the classes and the methods into all of the clusters that have caller or callee classes or methods from among the classes and the methods; and (4) remain the at least one of the classes and the methods; and processing, by the processor, the at least one of the classes and the methods in accordance with and responsive to a user selection of one of the four processing options.

2. The computer-implemented method of claim 1, wherein the classes and the methods are grouped into the clusters based on a feature vector of words in a source code of the monolithic application.

3. The computer-implemented method of claim 2, wherein the words in the source code of the monolithic application, on which the clustering is based, correspond to names of the classes and the methods in the monolithic application.

4. The computer-implemented method of claim 2, wherein the words in the source code of the monolithic application, on which the clustering is based, correspond to security levels for the classes and the methods in the monolithic application.

5. The computer-implemented method of claim 1, further comprising: identifying a particular one of the calls and the methods, that calls or is called from only one of the clusters; and merging the particular one of the calls and the methods into the only one of the clusters.

6. The computer-implemented method of claim 1, further comprising splitting a cluster that has any of the classes and the methods therein developed by different developers.

7. The computer-implemented method of claim 1, wherein a presentation of the four processing options is provided on the display device in descending order of a number of the function calls that can be eliminated by a selection thereof.

8. The computer-implemented method of claim 1, wherein said presenting step further presents, by the display device, information relating to relationships between the classes and the methods using a force-directed process.

9. The computer-implemented method of claim 1, wherein said determining step comprises analyzing a call graph derived from the monolithic application.

10. A computer program product for transforming a monolithic application into a set of microservices, the computer program product comprising a non-transitory computer readable storage medium having program instructions embodied therewith, the program instructions executable by a computer to cause the computer to perform a method comprising: grouping, by a processor, classes and methods of the monolithic application into clusters, each of the clusters corresponding to a respective one of the microservices; determining, by the processor for each of the classes and the methods in the clusters, a number of function calls thereto and therefrom; presenting, by a display device to a user, four processing options for at least the one of the classes and the methods in the clusters that has a maximum value for the number of functions calls thereto and therefrom compared to other ones of the classes and the methods, the four processing options comprising: (1) create a new cluster with the at least one of the classes and the methods; (2) merge the at least one of the classes and the methods into a different cluster; (3) duplicate the at least one of the classes and the methods into all of the clusters that have caller or callee classes or methods from among the classes and the methods; and (4) remain the at least one of the classes and the methods; and processing, by the processor, the at least one of the classes and the methods in accordance with and responsive to a user selection of one of the four processing options.

11. The computer program product of claim 10, wherein the classes and the methods are grouped into the clusters based on a feature vector of words in a source code of the monolithic application.

12. The computer program product of claim 11, wherein the words in the source code of the monolithic application, on which the clustering is based, correspond to names of the classes and the methods in the monolithic application.

13. The computer program product of claim 11, wherein the words in the source code of the monolithic application, on which the clustering is based, correspond to security levels for the classes and the methods in the monolithic application.

14. The computer program product of claim 10, further comprising: identifying a particular one of the calls and the methods, that calls or is called from only one of the clusters; and merging the particular one of the calls and the methods into the only one of the clusters.

15. The computer program product of claim 10, further comprising splitting a cluster that has any of the classes and the methods therein developed by different developers.

16. The computer program product of claim 10, wherein a presentation of the four processing options is provided on the display device in descending order of a number of the function calls that can be eliminated by a selection thereof.

17. The computer program product of claim 10, wherein said presenting step further presents, by the display device, information relating to relationships between the classes and the methods using a force-directed process.

18. The computer program product of claim 10, wherein said determining step comprises analyzing a call graph derived from the monolithic application.

19. A computer processing system for transforming a monolithic application into a set of microservices, comprising: a processor, configured to group classes and methods of the monolithic application into clusters, each of the clusters corresponding to a respective one of the microservices; determine, for each of the classes and the methods in the clusters, a number of function calls thereto and therefrom; a display device, configured to present to a user tour processing options for at least the one of the classes and the methods in the clusters that has a maximum value for the number of functions calls thereto and therefrom compared to other ones of the classes and the methods, the four processing options comprising: (1) create a new cluster with the at least one of the classes and the methods; (2) merge the at least one of the classes and the methods into a different cluster; (3) duplicate the at least one of the classes and the methods into all of the clusters that have caller or caller classes or methods from among the classes and the methods; and (4) remain the at least one of the classes and the methods; and wherein the processor is further configured to process the at least one of the classes and the methods in accordance with and responsive to a user selection of one of the four processing options.

20. The computer processing system of claim 19, wherein the classes and the methods are grouped into the clusters based on a feature vector of words in a source code of the monolithic application.

* * * * *